United States Patent
Butters et al.

(10) Patent No.: US 11,041,565 B2
(45) Date of Patent: Jun. 22, 2021

(54) FILTRATION METHODS, APPARATUS, AND SYSTEMS USING A CERAMIC SEAL GASKET

(71) Applicants: Brian E. Butters, London (CA); Anthony L. Powell, London (CA); John D. Pearce, London (CA)

(72) Inventors: Brian E. Butters, London (CA); Anthony L. Powell, London (CA); John D. Pearce, London (CA)

(73) Assignee: 1934612 Ontario Inc., London (CA)

( * ) Notice: Subject to any disclaimer, the term of this patent is extended or adjusted under 35 U.S.C. 154(b) by 406 days.

(21) Appl. No.: 14/084,493

(22) Filed: Nov. 19, 2013

(65) Prior Publication Data

US 2015/0136689 A1 May 21, 2015

(51) Int. Cl.
*F16J 15/02* (2006.01)
*B01D 39/20* (2006.01)
(Continued)

(52) U.S. Cl.
CPC ............ *F16J 15/022* (2013.01); *B01D 29/00* (2013.01); *B01D 39/2068* (2013.01);
(Continued)

(58) Field of Classification Search
None
See application file for complete search history.

(56) References Cited

U.S. PATENT DOCUMENTS

| | | | |
|---|---|---|---|
| 4,173,349 A | 11/1979 | Neale, III | |
| 4,473,471 A * | 9/1984 | Robichaud | B01D 27/08 210/443 |

(Continued)

FOREIGN PATENT DOCUMENTS

| | | |
|---|---|---|
| CA | 2500589 | 2/2004 |
| DE | 19638791 A1 | 3/1998 |

(Continued)

OTHER PUBLICATIONS

Dow FILMTEC Membranes: Product Information Bulletin, "Product Data Sheet for FILMTEC TW3001812-36", Accessed from Web Jul. 26, 2016, 2 total pages.*

(Continued)

*Primary Examiner* — Jonathan M Peo
(74) *Attorney, Agent, or Firm* — Baker & McKenzie LLP

(57) ABSTRACT

The present disclosure relates, according to some embodiments, to systems, apparatus, and methods for fluid filtration (e.g., water) with a ceramic membrane having a seal. For example, the present disclosure relates, in some embodiments, to a cross-flow fluid filtration assembly comprising (a) an elongate ceramic membrane filter having a first filter end, a second filter end, at least one filter side, and at least one interior channel spanning the length of the filter, (b) a first filtration seal gasket fixed to the first filter end forming a fluid-tight seal therebetween, and (c) a second filtration seal gasket fixed to the second filter end forming a fluid-tight seal therebetween. The present disclosure also relates to a cross-flow fluid filtration module comprising a fluid path defined by a contaminated media inlet chamber, a fluid filtration assembly positioned in a permeate chamber, and a concentrate chamber.

16 Claims, 11 Drawing Sheets

(51) Int. Cl.
  *B01D 29/00* (2006.01)
  *B01D 65/00* (2006.01)
  *B01D 63/06* (2006.01)

(52) U.S. Cl.
  CPC ......... *B01D 63/066* (2013.01); *B01D 65/003* (2013.01); *B01D 2201/347* (2013.01); *B01D 2271/027* (2013.01); *B01D 2313/21* (2013.01)

(56) References Cited

U.S. PATENT DOCUMENTS

| | | | | |
|---|---|---|---|---|
| 4,849,104 | A | * | 7/1989 | Garcera ............... B01D 63/061 210/323.2 |
| 5,997,739 | A | * | 12/1999 | Clausen ............ B01D 17/0214 210/232 |
| 6,958,120 | B2 | * | 10/2005 | Blase .................. B01D 63/061 210/321.82 |
| 2010/0147761 | A1 | * | 6/2010 | McCollam ............ B01D 29/00 210/450 |
| 2013/0240062 | A1 | | 9/2013 | Hoss |

FOREIGN PATENT DOCUMENTS

| | | |
|---|---|---|
| JP | 2004531389 A | 10/2004 |
| JP | 2007232317 A | 9/2007 |

OTHER PUBLICATIONS

International search report and written opinion of the international searching authority for co-pending PCT application No. PCT/IB2014/003034 dated Jun. 10, 2015.
Extended European Search Report dated Oct. 27, 2017 in connection with European Application No. 14863156.7, 5 pages.
Japanese Office Action dated Aug. 28, 2018 in connection with Japanese Application No. 2016-532578, 4 pages.
Korean Office Action dated Feb. 20, 2021 in connection with Korean Application No. 10-2016-7015889, 6 pages.

* cited by examiner

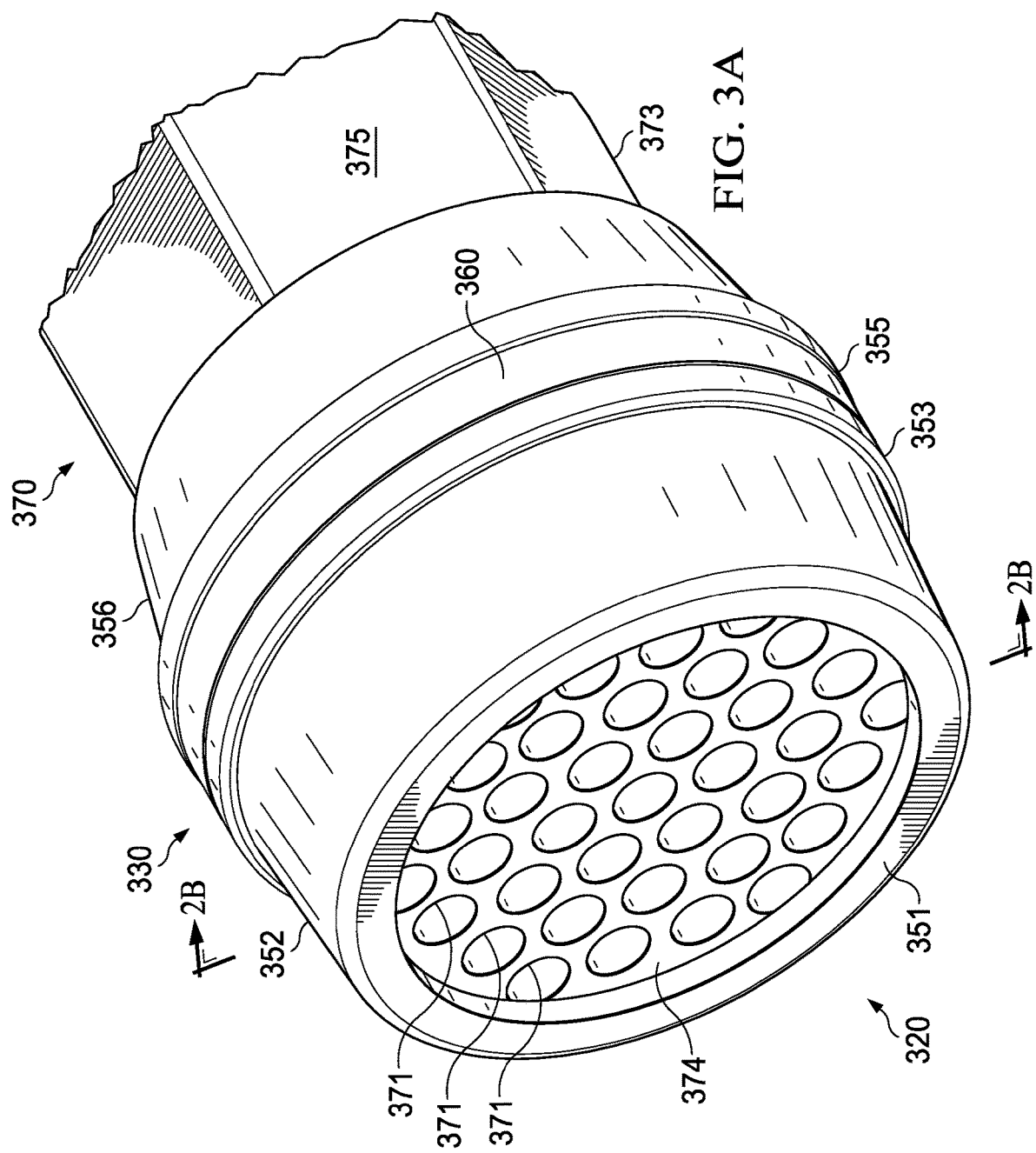

FILTRATION METHODS, APPARATUS, AND SYSTEMS USING A CERAMIC SEAL GASKET

FIELD OF THE DISCLOSURE

The present disclosure relates, in some embodiments, to systems, apparatus, and methods for fluid filtration (e.g., water) with a ceramic membrane having a seal gasket.

BACKGROUND OF THE DISCLOSURE

Since almost all forms of life need water to survive, the improvement of water quality in decontamination systems has typically been a subject of significant interest. As a result, treatment systems and techniques for removing contaminants from contaminated fluids have been developed in the past. Approaches include water treatment by applying various microorganisms, enzymes and nutrients for the microorganisms in water. Other approaches involve placing chemicals in the contaminated fluids, such as chlorine, in an effort to decontaminate supplies. These additives can, however, create more problems than they solve. Some approaches avoid the use of added chemicals or microorganisms by using a filtration strategy. Such systems have either failed or failed to realize their potential, such that challenges remain.

SUMMARY

Accordingly, a need has arisen for improved fluid purification. For example, a need exists for fluid purification systems, apparatus, and methods that display improved filter bypass performance.

The present disclosure relates, according to some embodiments, to systems, apparatus, and methods for fluid filtration (e.g., water) with a ceramic membrane having a seal gasket. For example, a seal gasket may comprise a seal gasket wall defining a hollow interior and an outer, generally biconic (e.g., barrel) profile A seal gasket wall may comprise a central longitudinal axis, an interior circumferential surface, an outer circumferential surface, a first end comprising a lip, a first end aperture defined by the lip, a second end, and/or a second end aperture defined by the interior circumferential surface at the second end. An outer circumferential surface may comprise at least one medial circumferential channel, a first taper thickening from the first end toward the medial channel, and a second taper thickening from the second end toward the medial channel. An outer circumferential surface may comprise a first medial ridge between a first taper and a medial channel and/or a second medial ridge between a second taper and a medial channel. A first medial ridge, a second medial ridge, and/or a medial channel may be parallel to each other and/or perpendicular to the central longitudinal axis. In some embodiments, an interior circumferential surface may define a generally hexagonal (e.g., regular hexagonal) cross-section, a generally circular (e.g., circular) cross-section, or a generally elliptical (e.g., elliptical) cross-section.

A seal gasket may comprise, according to some embodiments, a hydrophobic material, a resilient, an elastomeric material, or combinations thereof. For example, a seal gasket may comprise a natural rubber, a synthetic rubber, a neoprene, a perfluoroelastomer, an ethylene acrylic elastomer, a polyolefin elastomer, an olefin block copolymer, an ethylene-propylene-diene monomer, a thermoplastic, a plastomer, a brominated isobutylene paramethyl-styrene terpolymer, a silicone, or combinations thereof.

In some embodiments, the longest dimension across an interior circumferential surface cross-section is constant along the length of the gasket except for the lip. A first and second taper may each independently have an angle from about 1° to about 30°, measured between the central axis and the surface of the taper from a section co-planar with the central axis (or a projection on to a plane parallel to the central axis). A seal gasket independently may have a length from about 1 cm to about 30 cm and an outer diameter from about 1 cm to about 30 cm.

A filtration seal gasket may have a generally tubular shape or a generally cylindrical shape in some embodiments. A seal gasket may comprise a first thickening at a first end, the first thickening directed radially inward and forming a lip, a second thickening directed radially outward and forming a first taper extending from the first end toward the middle of the gasket, a third thickening directed radially outward and forming a first circumferential ridge, a fourth thickening directed radially outward and forming a second circumferential ridge distal to the first ridge, and/or a fifth thickening directed radially outward and forming a second taper extending from a second end toward the middle of the gasket. A first taper may extend to a third thickening, a second taper may extend to a fourth thickening, or a first taper may extend to a third thickening and a second taper may extend to a fourth thickening. A seal gasket may have an inner gasket surface defining a central cavity. In some embodiments, cross-sections (e.g., successive cross-sections) of the central cavity have substantially the same shape and dimensions along the length of the gasket except at the lip. The maximum dimension of cross-sections of the central cavity at the lip may be smaller than the maximum dimension of cross-sections of the central cavity along the remainder of its length. In some embodiments, a seal gasket may be seamless (e.g., to improve formation of a fluid-tight seal). A seal gasket may comprise a reinforcing ring channel, for example, positioned between the third and fourth thickenings. In some embodiments, a first taper and a second taper may be the same or different. For example, the pitch of a first taper may be different than the pitch of a second taper.

The present disclosure relates, in some embodiments, to an elongate gasket comprising a seamless wall having an outward surface, a second surface opposite the outward surface, a first edge comprising a lip, and a second edge opposite the first edge. A wall of an elongate gasket may extend around (e.g., surround) a central cavity, a first edge may define a first opening to the cavity, a second edge may define a second opening to the cavity, and an outward surface may define oppositely disposed first and second tapers with the thinner regions of each taper adjacent to the first and second edges, respectively. A central cavity may comprise (e.g., define) a central longitudinal axis. A lip may be directed toward the central cavity. An outward surface may define a pair of ridges (e.g., parallel to each other and/or perpendicular to the central axis) between the tapers.

The present disclosure also relates, in some embodiments, to a cross-flow fluid filtration assembly comprising (a) an elongate ceramic membrane filter having a first filter end, a second filter end, at least one filter side, and at least one interior channel spanning the length of the filter, (b) a first filtration seal gasket fixed to the first filter end forming a fluid-tight seal therebetween, and (c) a second filtration seal gasket fixed to the second filter end forming a fluid-tight seal therebetween. Each seal gasket may be independently selected from any of the disclosed seal gaskets. For example, a seal gasket may comprise a seamless wall having an outward gasket surface, a second gasket surface opposite the outward gasket surface, a first gasket edge comprising a lip, a second gasket edge opposite the first gasket edge, wherein the wall extends around a central cavity, the first gasket edge defines a first opening to the cavity, the second gasket edge defines a second opening to the cavity, and the outward gasket surface defines oppositely disposed first and second tapers with the thinner regions of each taper adjacent to the first and second gasket edges, respectively. In some embodiments, each lip of each seal gasket may overhang a portion of each filter. Gasket cavities and filter ends are mutually sized to form a fluid-tight seal therebetween.

In some embodiments, the present disclosure relates to cross-flow fluid filtration modules comprising a fluid path defined by a contaminated media inlet chamber, a fluid filtration assembly positioned in a permeate chamber, and a concentrate chamber. For example, a filtration module may comprise (a) a contaminated media inlet chamber configured to receive contaminated media, (b) a filtration assembly comprising (i) a filter comprising a central channel lined with a filtration layer (ii) a first seal gasket at the inlet chamber end of the channel and (iii) a second seal gasket at the opposite end, wherein the channel is in fluid communication with the inlet chamber, (c) a concentrate chamber in fluid communication with the filtration assembly channel, and (d) a permeate chamber configured to receive permeate from the filtration assembly and fluidically isolated from the inlet chamber by the first seal gasket and fluidically isolated from the concentrate chamber by the second seal gasket. In some embodiments, a permeate chamber may be isolated from contaminated media in an inlet chamber by a triple seal. For example, a triple seal may comprise a first seal between a first end of a seal gasket and a contaminated media chamber, a second seal between a second end of a seal gasket and a permeate chamber, and a third seal between a seal gasket and a filter. A triple seal may obviate use of an O-ring between a contaminated media chamber and a permeate chamber. A triple seal may be configured to reduce the risk of filter bypass, for example, by separating the first seal and the second seal with a non-pressurized zone. In some embodiments, a contaminated media may be pressurized. If any fluid escapes through the first seal into the non-pressurized zone, it will lack any motive force to penetrate the second seal.

The present disclosure relates, in some embodiments, to methods of filtering a contaminated media using a triple seal filtration module and methods of making a triple seal filtration module.

BRIEF DESCRIPTION OF THE DRAWINGS

Some embodiments of the disclosure may be understood by referring, in part, to the present disclosure and the accompanying drawings, wherein:

FIG. 3A illustrates a perspective view of a filtration assembly according to a specific example embodiment of the disclosure;

Figure 1A:
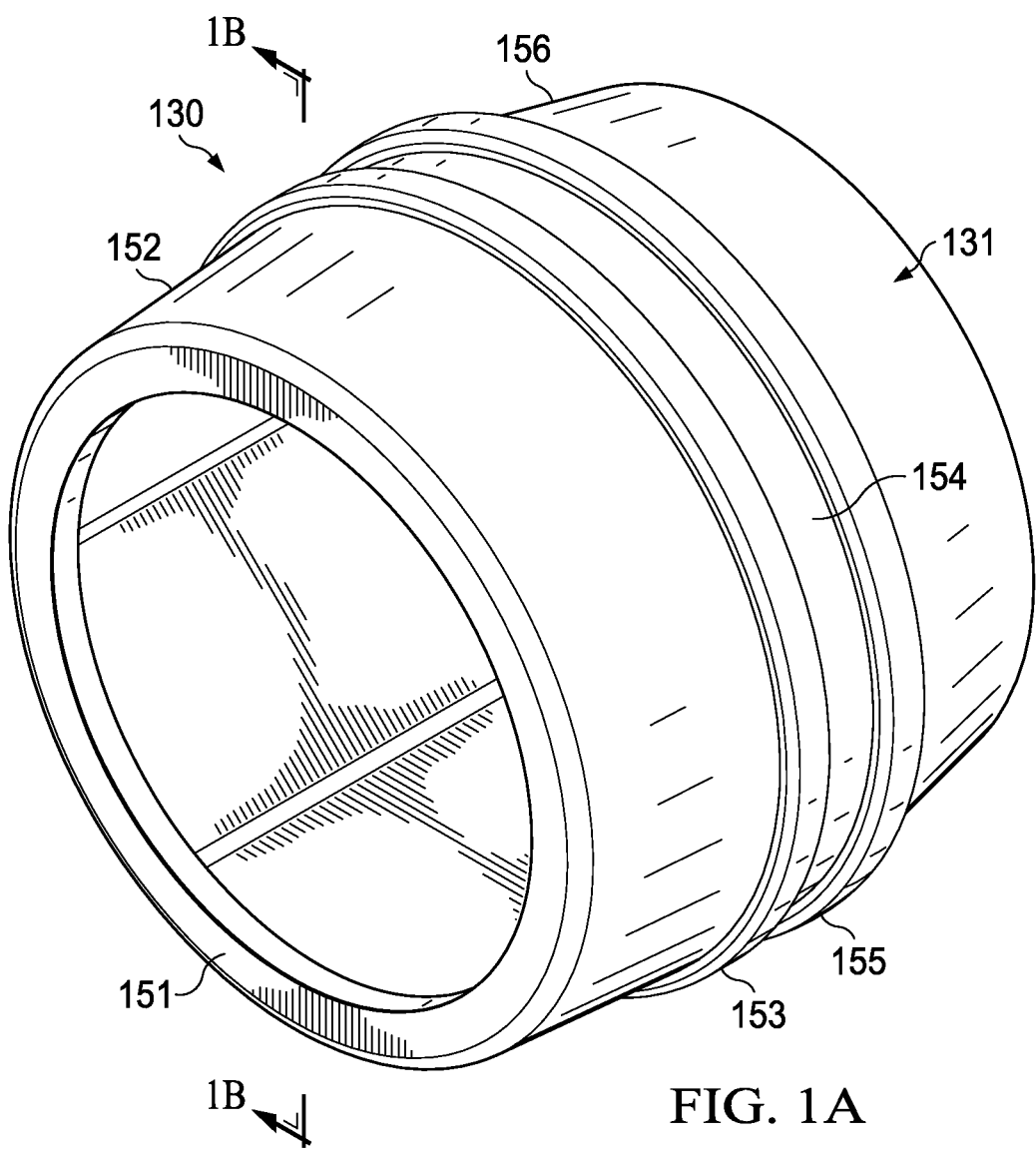
FIG. 1A illustrates a perspective view of a membrane seal gasket according to a specific example embodiment of the disclosure.

Table 1 below includes the reference numerals used in this application. The thousands and hundreds digits correspond to the figure in which the item appears while the tens and ones digits correspond to the particular item indicated. Similar structures share matching tens and ones digits.

TABLE 1

Figure 1B:
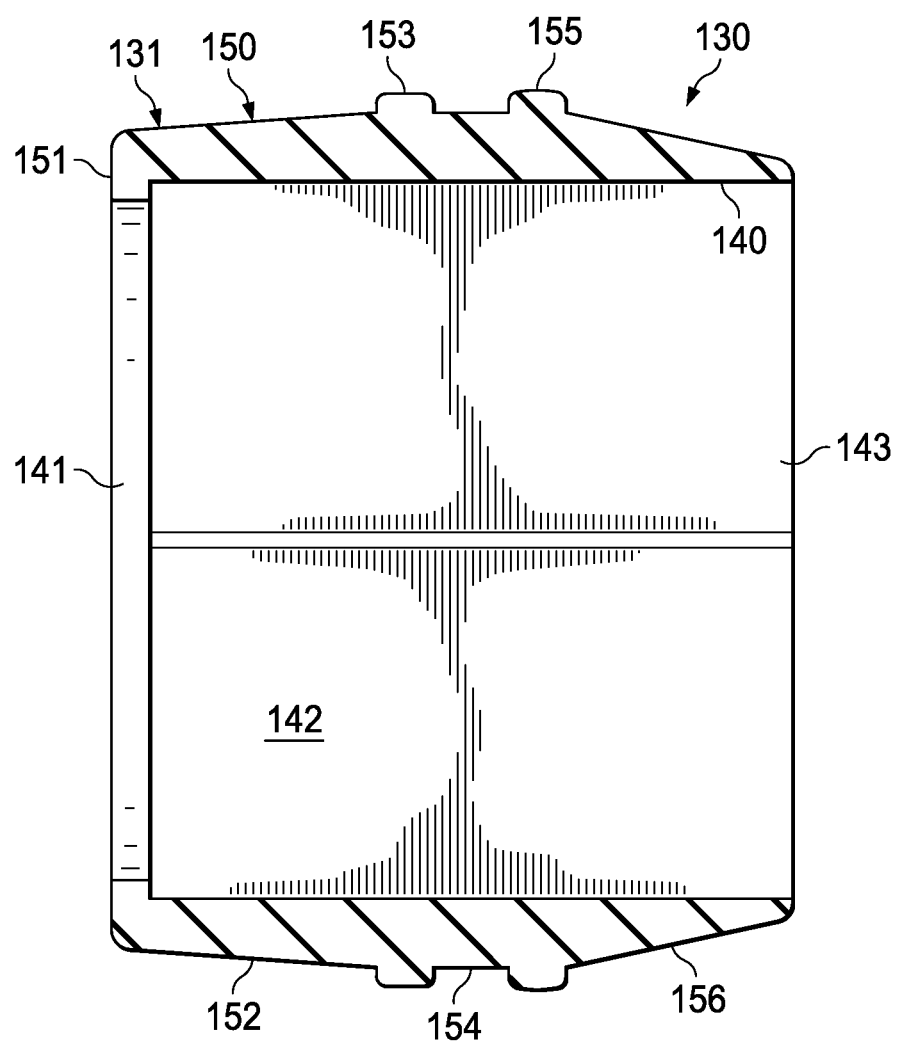
FIG. 1B illustrates a section view of the membrane seal gasket shown in FIG. 1A.
Figure 2A:
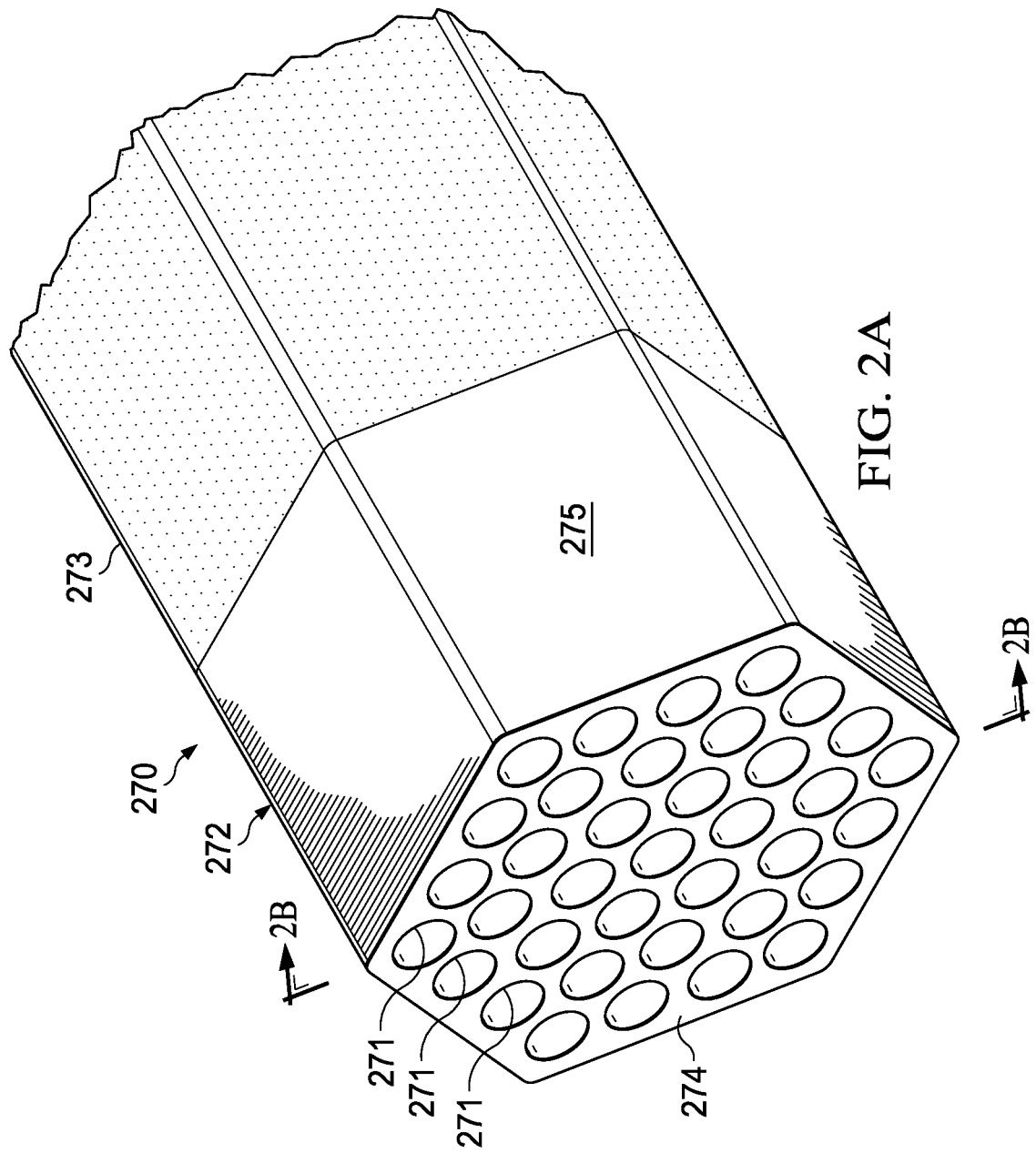
FIG. 2A illustrates a perspective view of a ceramic membrane according to a specific example embodiment of the disclosure.
Figure 2B:
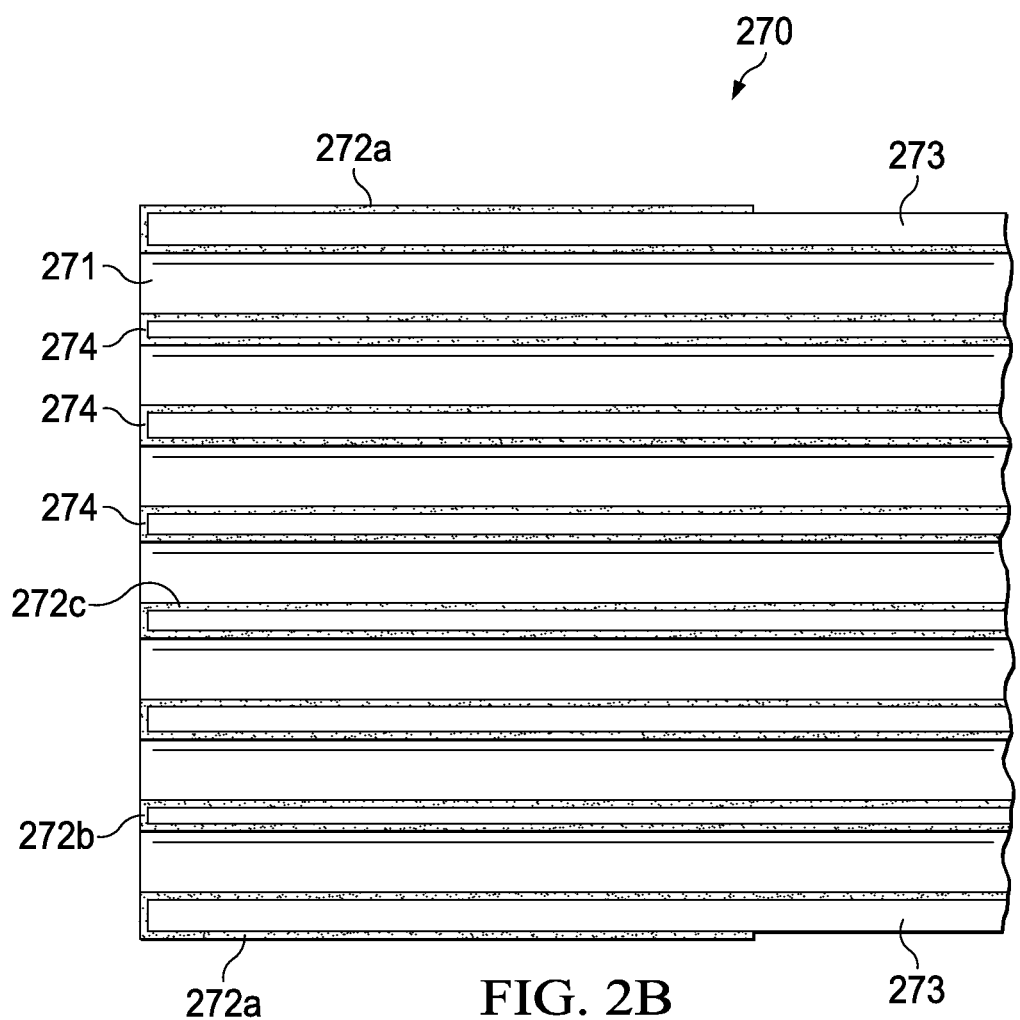
FIG. 2B illustrates a section view of the ceramic membrane shown in FIG. 2A.
Figure 3B:
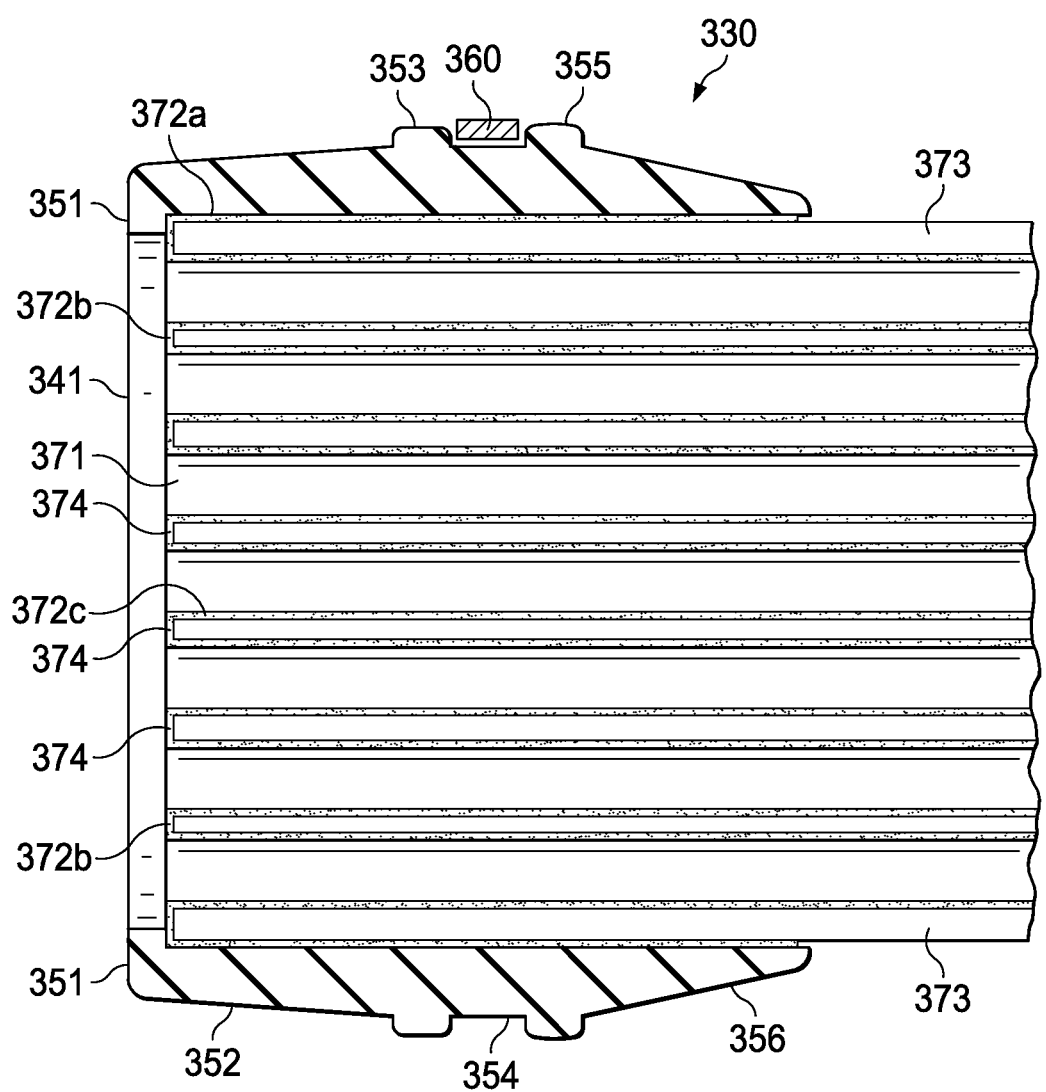
FIG. 3B illustrates a section view of the filtration assembly shown in FIG. 3A.
Figure 4:
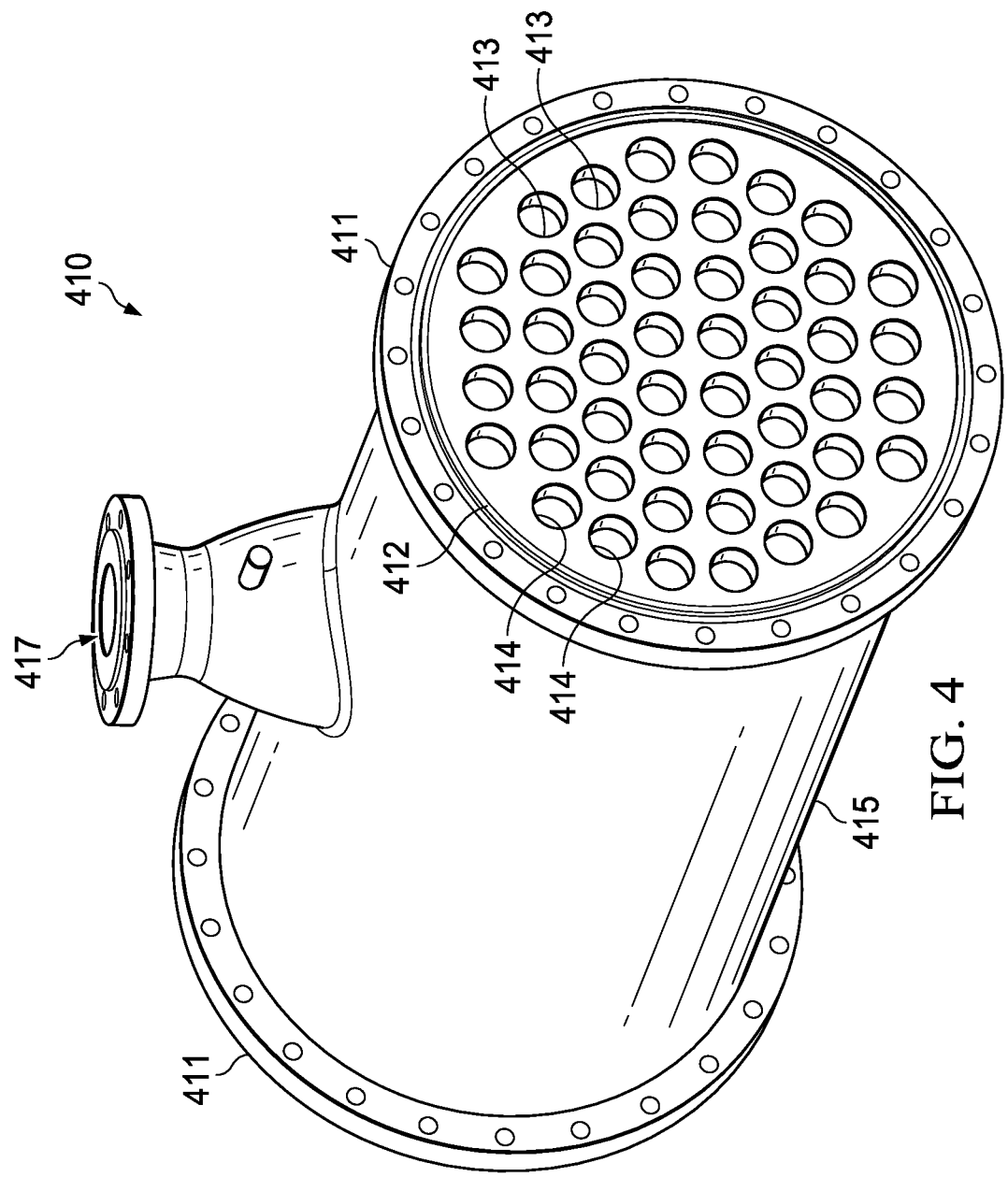
FIG. 4 illustrates a perspective view of a permeate chamber according to a specific example embodiment of the disclosure.
Figure 5:
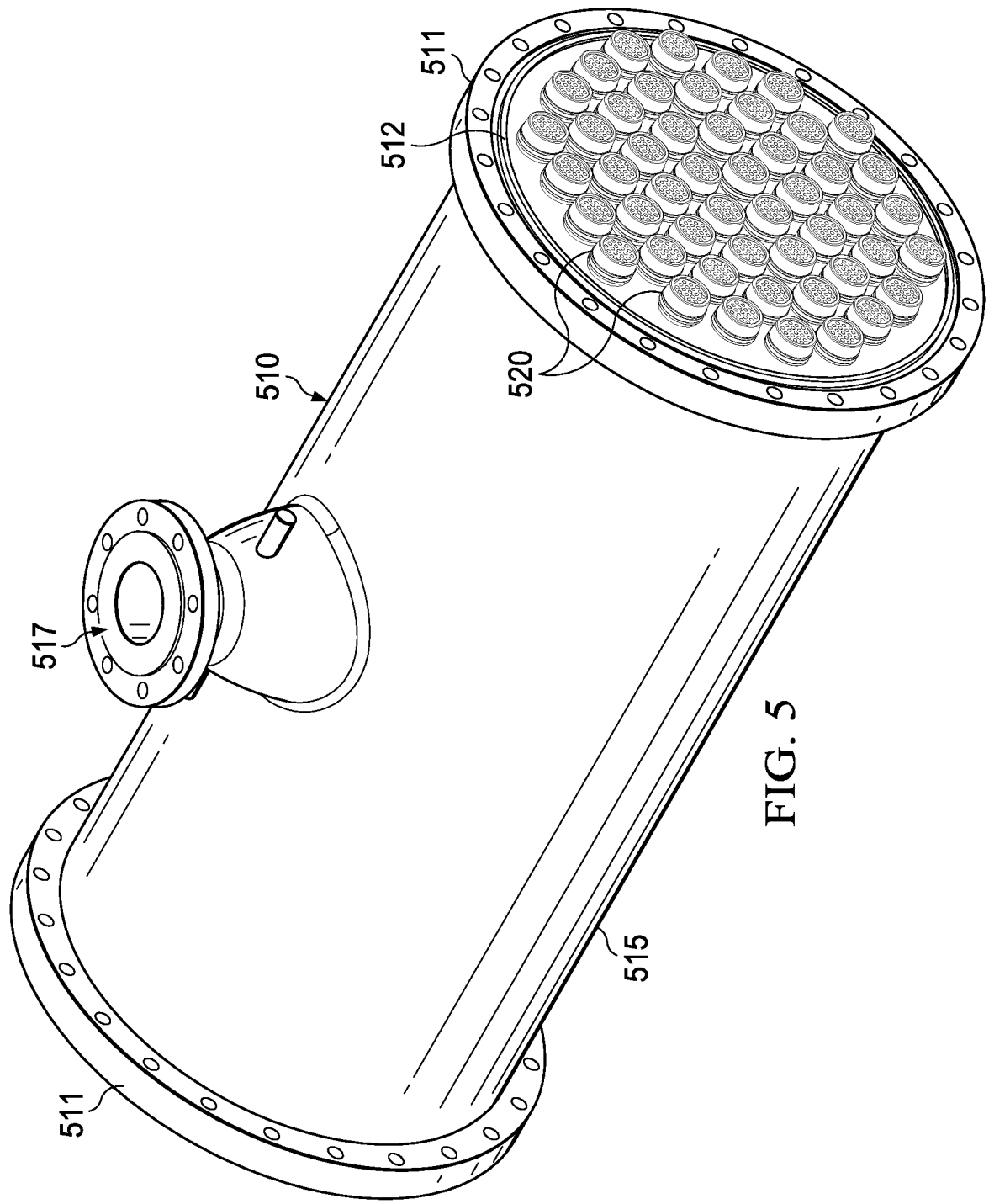
FIG. 5 illustrates a perspective view of a permeate chamber with engaged filtration assemblies according to a specific example embodiment of the disclosure.
Figure 6A:
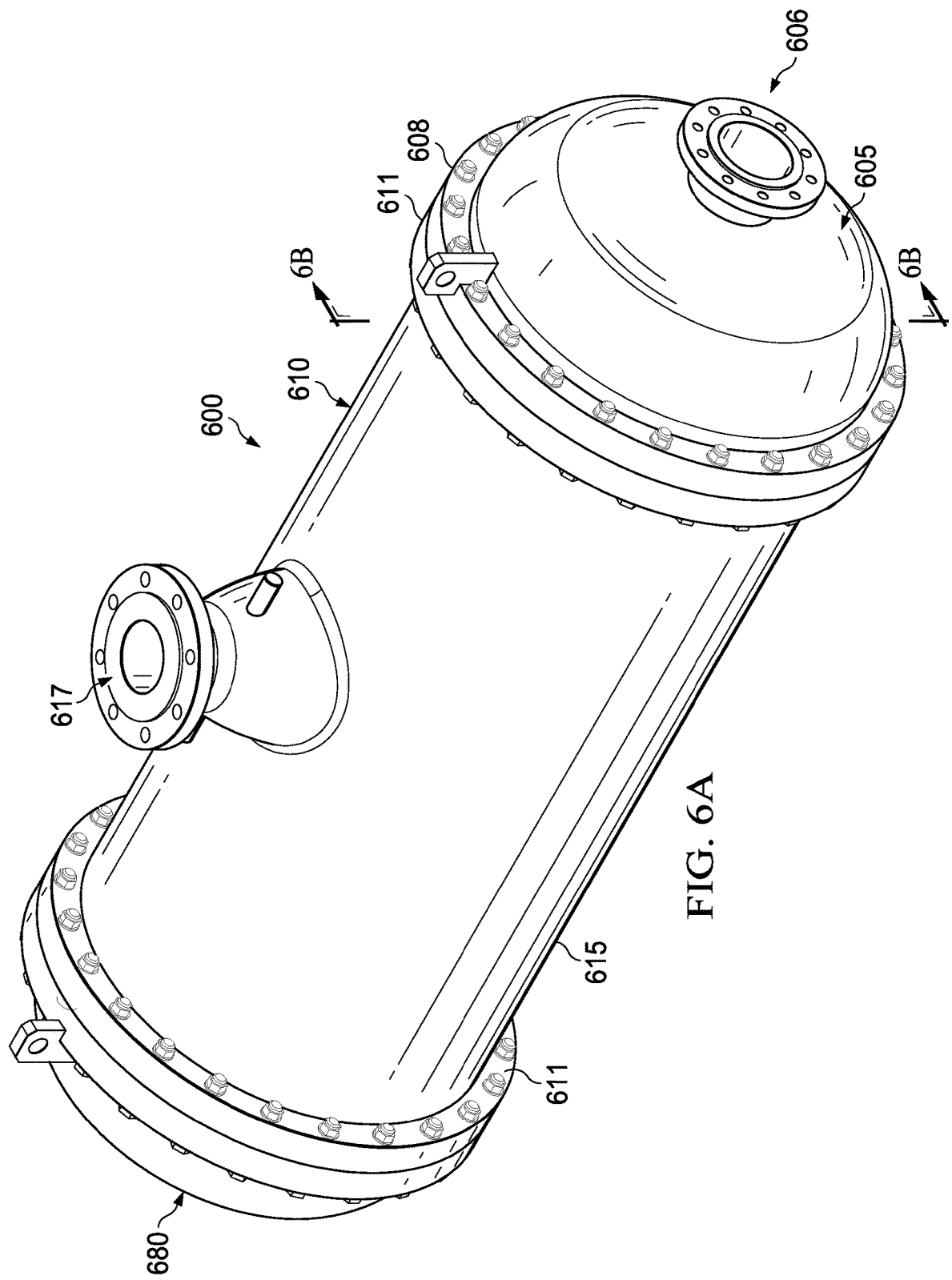
FIG. 6A illustrates a perspective view of a filtration module according to a specific example embodiment of the disclosure.
Figure 6B:
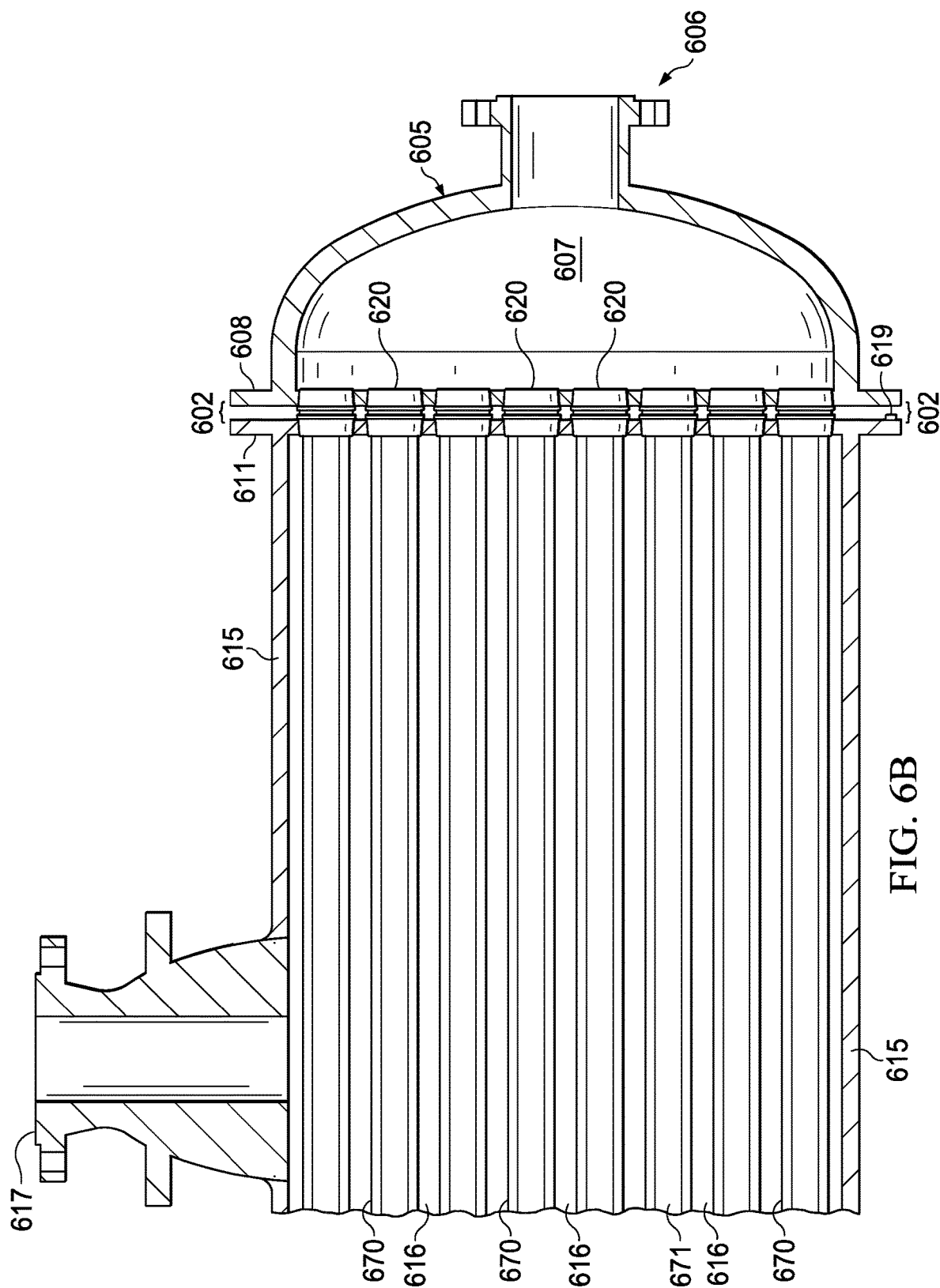
FIG. 6B illustrates a section view of the filtration module shown in FIG. 6A.
Figure 6C:
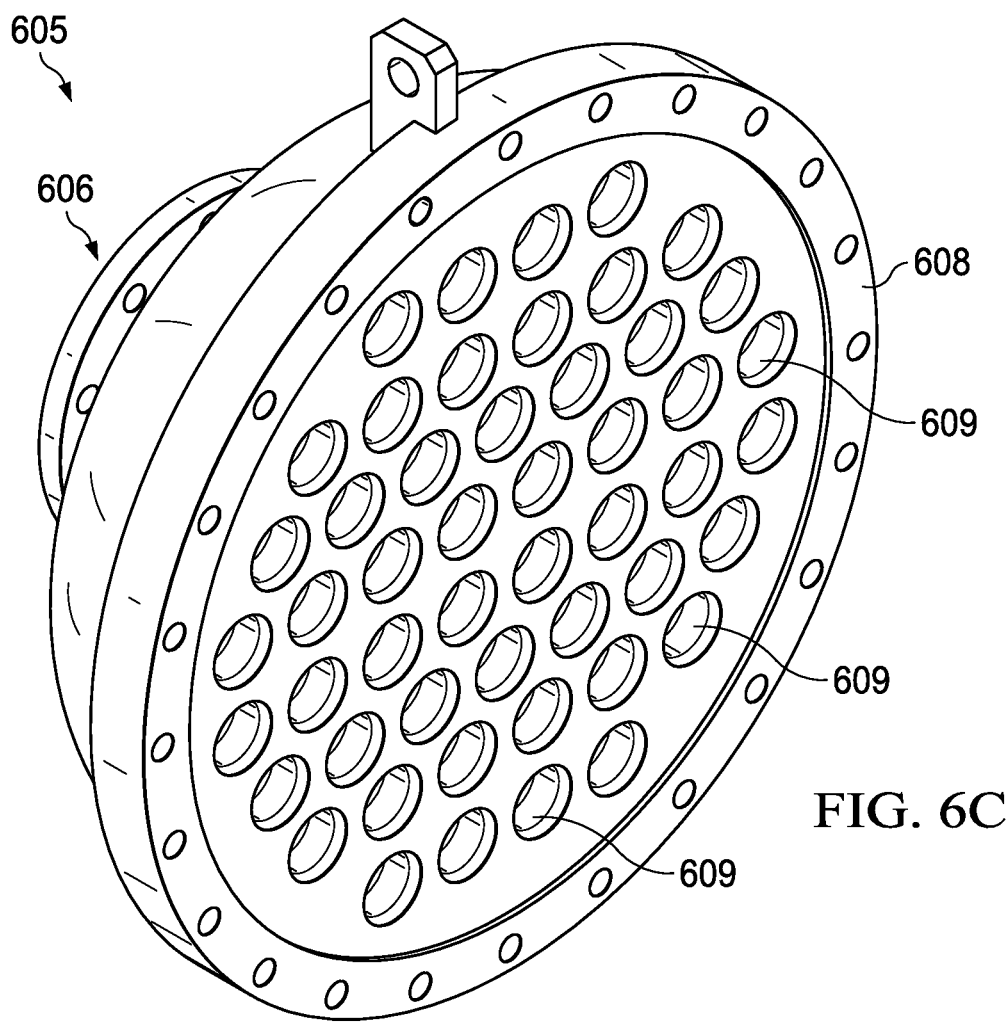
FIG. 6C illustrates a perspective view of the filtration module shown in FIG. 6A.
Figure 7:
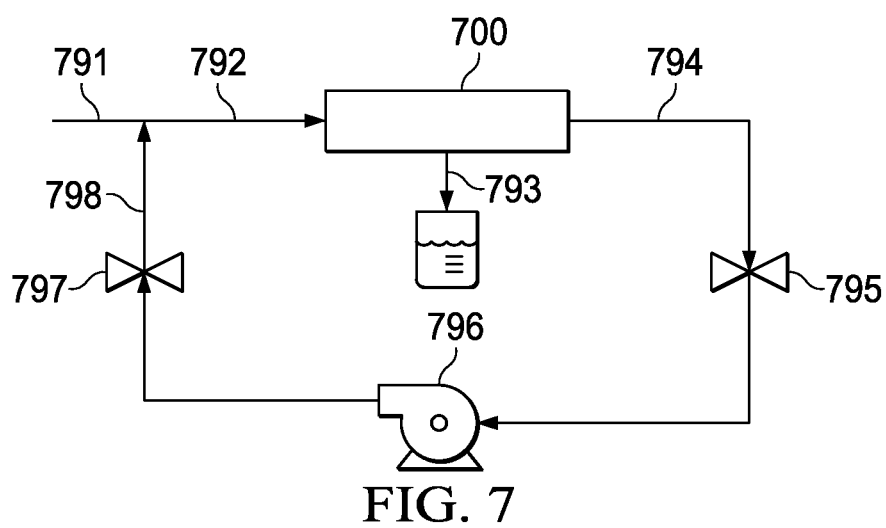
FIG. 7 illustrates a schematic view of a filtration system according to a specific example embodiment of the disclosure.

|  | FIG. 1A | FIG. 1B | FIG. 2A | FIG. 2B | FIG. 3 | FIG. 4 | FIG. 5 | FIG. 6A | FIG. 6B | FIG. 6C | FIG. 7 |
| --- | --- | --- | --- | --- | --- | --- | --- | --- | --- | --- | --- |
| Filtration Module |  |  |  |  |  |  |  | 600 |  |  |  |
| Gap |  |  |  |  |  |  |  |  | 602 |  |  |
| Contaminated media chamber |  |  |  |  |  |  |  | 605 | 605 | 605 |  |
| Inlet |  |  |  |  |  |  |  | 606 | 606 | 606 |  |
| Cavity |  |  |  |  |  |  |  |  | 607 |  |  |
| Flange |  |  |  |  |  |  |  | 608 | 608 | 608 |  |
| Aperture |  |  |  |  |  |  |  |  | 609 |  |  |
| Permeate chamber |  |  |  |  |  | 410 | 510 | 610 |  |  |  |
| Flange |  |  |  |  |  | 411 | 511 | 611 | 611 |  |  |
| Aperture |  |  |  |  |  | 413 |  |  |  |  |  |
| Tapered Aperture Wall |  |  |  |  |  | 414 |  |  |  |  |  |
| Permeate chamber body |  |  |  |  |  | 415 | 515 | 615 | 615 |  |  |
| Permeate chamber cavity |  |  |  |  |  |  |  |  | 616 |  |  |
| Outlet |  |  |  |  |  | 417 | 517 | 617 | 617 |  |  |
| Sensor |  |  |  |  |  |  |  |  | 619 |  |  |

TABLE 1-continued

| | FIG. 1A | FIG. 1B | FIG. 2A | FIG. 2B | FIG. 3 | FIG. 4 | FIG. 5 | FIG. 6A | FIG. 6B | FIG. 6C | FIG. 7 |
|---|---|---|---|---|---|---|---|---|---|---|---|
| Filtration Assembly | | | | | 320 | | 520 | 620 | | | |
| Seal gasket | 130 | 130 | | | 330 | 330 | | 630 | | | |
| Seal gasket wall | 131 | 131 | | | | | | | | | |
| Inner Surface | | 140 | | | | | | | | | |
| Proximal Aperture | | 141 | | | | 341 | | | | | |
| Cavity | | 142 | | | | | | | | | |
| Distal Aperture | | 143 | | | | | | | | | |
| Outer Surface | | 150 | | | | | | | | | |
| Lip | 151 | 151 | | | 351 | 351 | | | | | |
| Taper | 152 | 152 | | | 352 | 352 | | | | | |
| Ridge | 153 | 153 | | | 353 | 353 | | | | | |
| Channel | 154 | 154 | | | | | | | | | |
| Ridge | 155 | 155 | | | 355 | 355 | | | | | |
| Taper | 156 | 156 | | | 356 | 356 | | | | | |
| Band | | | | | 360 | 360 | | | | | |
| Filter | | | 270 | 270 | 370 | | | 670 | | | |
| Channel | | | 271 | 271 | 371 | 371 | | | | | |
| Filtration Layer | | | 272 | 272 | | 372 | | | | | |
| Outer Filtration Layer | | | | 272a | | 372a | | | | | |
| Face Filtration Layer | | | | 272b | | 372b | | | | | |
| Inner Filtration Layer | | | | 272c | | | | | | | |
| Substrate | | | 273 | 273 | 373 | 373 | | | | | |
| Face | | | 274 | | 374 | 374 | | | | | |
| Side | | | 275 | | 375 | | | | | | |
| Concentrate chamber | | | | | | | | 680 | | | |
| Contaminated media | | | | | | | | | | | 791 |
| Feed | | | | | | | | | | | 792 |
| Permeate | | | | | | | | | | | 793 |
| Concentrate | | | | | | | | | | | 794 |
| Valve | | | | | | | | | | | 795 |
| Pump | | | | | | | | | | | 796 |
| Valve | | | | | | | | | | | 797 |
| Concentrate | | | | | | | | | | | 798 |

DETAILED DESCRIPTION

The present disclosure relates, in some embodiments, to systems, apparatus, and methods for fluid purification (e.g., chemical-free purification). In some embodiments, the present disclosure relates to systems, apparatus, and methods for fluid filtration (e.g., water). For example, a system for fluid filtration may comprise a contaminated media stream, a filtration module, a permeate stream, and combinations thereof. A system optionally may comprise a concentrate stream, one or more pumps, one or more valves, one or more compressed gas sources, one or more storage tanks, and combinations thereof. Concentrate may have a higher concentration of one or more contaminants than a corresponding contaminated media feed, for example, because of volume lost as permeate. In some embodiments, permeate may be collected as a finished product or subjected to further purification measures. Concentrate may be collected as a final waste product or subjected to further purification measures. Additional purification measures may include, for example, oxidation, ultraviolet irradiation, photocatalysis, filtration, and combinations thereof. For example, concentrate may be filtered a second time using the same or another filter. Concentrate to be recycled through the same filter may or may not be combined with naïve contaminated media.

Filtration Module

The present disclosure relates, in some embodiments, to filtration modules. For example, a filtration module may comprise a contaminated media chamber having an inlet to admit contaminated media and an end plate, the end plate comprising a plurality of frustoconical openings; a permeate chamber having a cylindrical body and an end plate at each end, each end plate comprising a plurality of frustoconical openings, and/or a filtration assembly in fluid communication with both a contaminated media chamber and a permeate chamber. A filtration module may comprise, according to some embodiments, a contaminated media chamber, a filtration assembly (e.g., membrane), a permeate chamber, and/or combinations thereof. For example, a contaminated media chamber may have an interior cavity, an inlet to admit contaminated media to the cavity, and a filtration assembly interface. A permeate chamber may comprise a filtration assembly interface, an interior permeate cavity, and a permeate outlet in fluid communication with the interior permeate cavity.

A filtration assembly may be in fluid communication with a contaminated media chamber and/or a permeate chamber. According to some embodiments, a contaminated media chamber (e.g., a contaminated media chamber cavity) may be in fluid communication with a permeate chamber ((e.g., a permeate chamber cavity). According to some embodiments, a filtration assembly may engage a contaminated media chamber interface and/or a permeate chamber interface.

Contaminated Media Chamber

A contaminated media chamber may comprise, in some embodiments, an inlet and a filtration assembly interface, according to some embodiment. A contaminated media chamber may comprise an interior cavity. An interior cavity may have any desired size and/or any desired shape. For example, a cavity may have a rounded and/or generally dome shape. A contaminated media chamber may have an outer perimeter and/or circumference. In some embodiments an outer perimeter and/or circumference may be configured as and/or define a contaminated media chamber flange. A flange may be configured to engage a permeate chamber (e.g., a permeate chamber comprising a similar or mated flange). In some embodiments, a contaminated media chamber flange may comprise a channel for a gasket, O-ring, or other seal. A contaminated media chamber channel may be positioned on one face of a flange and/or substantially parallel an outer perimeter and/or circumference in some embodiments.

According to some embodiments, a contaminated media chamber may have one or more inlets and/or one or more outlets. For example, a contaminated media chamber may have a filtration assembly interface comprising one or more outlets. Each outlet may be configured to engage a filtration assembly, for example, with a substantially fluid-tight seal. In some embodiments, an outlet may have any desired shape (e.g., cylindrical, conical, frustoconical). All contaminated media chamber outlets may be positioned in an interface and/or inside a contaminated media chamber channel.

A concentrate chamber may have a structure corresponding to a contaminated media chamber and be configured to receive concentrate flowing out of each filtration assembly. For example, a concentrate chamber may have a cavity, an outlet, and/or a filtration assembly interface comprising at least one aperture (e.g., at least one frustoconical aperture).

A contaminated media chamber and/or a concentrate chamber may have any desired dimensions. According to some embodiments, a contaminated media chamber and/or a concentrate chamber may have a length from about 10 cm to about 150 cm, from about 20 cm to about 100 cm, from about 15 cm to about 75 cm, and/or combinations thereof. A section taken perpendicular to a chamber's longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, and/or combinations thereof. A filter may comprise one or more longitudinal channels. The shape and/or dimensions of a contaminated media chamber and a concentrate chamber may be the same or different.

Permeate Chamber

The present disclosure relates, in some embodiments, to a permeate chamber comprising a filtration assembly interface, an interior permeate cavity, and a permeate outlet in fluid communication with the interior permeate cavity. A permeate chamber may have any desired shape. In some embodiments, a permeate chamber may have a generally cylindrical shape defining a central longitudinal axis and a cavity spanning its length. For example, up to all sections perpendicular to a central permeate chamber axis may have a generally annular shape. A permeate chamber may have a hollow, generally cylindrical shape, a first end and a second end according to some embodiments. Each end may define an aperture sized and/or shaped to receive a filtration assembly interface.

A permeate chamber may have any desired dimensions. According to some embodiments, a permeate chamber may be from about 10 cm to about 5 m long, from about 50 cm to about 5 m long, from about 1 m to about 3 m long, and/or combinations thereof. A section taken perpendicular to the longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, and/or combinations thereof. A filter may comprise one or more longitudinal channels.

Filtration Assembly

Fluid communication between a contaminated media chamber and a permeate chamber may be mediated by a filtration assembly. For example, at least some fluid may flow through an inlet into a contaminated media chamber cavity, through a contaminated media chamber cavity into a filtration assembly, through a filtration assembly into a permeate cavity, and/or through a permeate cavity and out through an outlet. A filtration module may comprise, according to some embodiments, a filter and at least one seal gasket. A seal gasket may be configured to limit movement of fluid between a contaminated media chamber and a permeate chamber apart from a filter. For example, a filtration assembly may partially, substantially completely, of completely prevent fluid bypass.

A filtration assembly may be configured to operate in any desired manner. For example, a filtration assembly may be configured to operate as a dead end filter or as a crossflow filter. An elongate membrane may define an interior channel with a longitudinal axis, in some embodiments. A crossflow filtration module may include a filtration assembly comprising an elongate membrane configured such that its longitudinal axis is generally parallel to the direction of fluid flow.

Ceramic Membrane

A filtration assembly may comprise, according to some embodiments, a filter of any desired size, shape, or composition. For example, a filtration assembly may comprise a generally tubular filter (e.g., a ceramic filter) and a seal gasket at one end or a seal gasket at both ends. A filtration assembly may include any desired filter or filter material. For example, a filtration assembly may comprise a filter having one or more organic polymers and/or one or more ceramic materials. Examples of filters (e.g., ceramic membranes) may include microfiltration filters, ultrafiltration filters, antimicrobial filters, maintenance-free filters, and combinations thereof. A filter may comprise an antimicrobial agent. For example, a ceramic filter may comprise silver (e.g., an impregnated, non-leachable silver).

In some embodiments, ceramic filters may be durable (e.g., more durable than organic polymer filters). For example, ceramic filters may be resistant to mechanical damage, solvents, and/or microbes. Example metrics of performance and/or resistance may be the degree of filtration provided for one or more contaminants, conductivity, usable lifespan, and/or combinations thereof. Desired performance and/or resistance may be expressed as a fraction (e.g., percentage) compared in the presence or absence of challenge, relative to another membrane, or against a threshold or target value.

In some embodiments, a filter may have a wall defining an elongate tube having at least one interior channel. A filter may comprise a contaminated media-facing surface and a permeate facing surface, in some embodiments. For example, a filter may define an elongate tube having at least one interior surface (e.g., a contaminated media-facing surface), at least one interior channel, and an exterior surface (e.g., a permeate chamber facing surface). Contaminated fluid may enter at least one interior channel at one end and flow down the length of a filter. As it travels along a channel, some fluid may traverse a filter wall and form permeate.

A ceramic filter may comprise, in some embodiments, a filtration layer (e.g., a membrane) having smaller pores and an underlying base having larger pores. A typical ceramic filter may include a ceramic membrane only inside the channels and an epoxy coating sealing the end face. According to some embodiments, a filtration layer may instead cover an interior surface, an end face, and/or an exterior surface. For example, a filtration layer may define, be coextensive with, and/or cover a contaminated media facing surface of a filter. A base may define, be coextensive with, and/or cover a permeate facing surface. A ceramic membrane (e.g., filtration layer) may wrap around both the face of the filter and down the outside (on each end).

An elongate ceramic membrane may have a cross-section (e.g., a section perpendicular to the central longitudinal axis) with any desired regular or irregular geometric shape. For example, a membrane cross-section may have a shape selected from generally circular, generally elliptical, generally polygonal (e.g., hexagonal), and/or combinations thereof. An elongate membrane may have a central axis with one or more channels along the length of the membrane and generally parallel to the axis.

A filter may have any desired dimensions. According to some embodiments, an elongate filter may be from about 10 cm to about 5 m long, from about 50 cm to about 5 m long, from about 1 m to about 3 m long, and/or combinations thereof. A section taken perpendicular to the longitudinal axis (e.g., "diameter") may be from about 2 cm to about 30 cm in diameter, from about 2 cm to about 20 cm in diameter, from about 5 cm to about 20 cm in diameter, from about 5 cm to about 15 cm in diameter, and/or combinations thereof. A filter may comprise one or more longitudinal channels. Each channel may independently have any desired shape and/or dimension. In some embodiments, a channel may have a generally circular shape with a radius from about 1 mm to about 15 cm, from about 2 mm to about 10 cm, from about 5 mm to about 5 cm, from about 1 cm to about 5 cm, and/or combinations thereof.

Filter channels and pores may be distinguished, according to some embodiments, on the basis of size, geometry, and/or function. For example, pores may be one or more orders of magnitude smaller than channels (e.g., 2-10 orders smaller), may define an irregular (e.g., convoluted) flow path, and/or admit only molecules below a threshold size. Channels may be one or more orders of magnitude larger than pores, define a regular flow path, and/or admit all or substantially all molecules in a contaminated media.

Seal Gasket

The present disclosure relates, in some embodiments, to systems, apparatus, and methods for fluid filtration (e.g., water) with a ceramic filter having a seal gasket. A seal gasket may be configured to engage (e.g., to form a fluid-tight seal) a filtration assembly interface on a contaminated media chamber and/or a filtration assembly interface on a permeate chamber. For example, a seal gasket may be configured to form a triple seal when engaged. In some embodiments, a seal gasket may constitute a barrier (e.g., a substantial or complete barrier) between contaminated media and permeate. A seal gasket may be configured, in some embodiments, to operate as a complete barrier between contaminated media and permeate such that quality control testing of the permeate (e.g., in a continuous or semi-continuously operating system) may be conducted less frequently.

In some embodiments, each end of a ceramic filter may be sealed (e.g., with a seal gasket), which may eliminate any potential for filter bypass. If a leak occurs from a contaminated media side, the concentrate side, or permeate side of the water path, it will occur outside of the module, according to some embodiments. For example, concentrate may not leak into the permeate and permeate may not leak into concentrate. Likewise, contaminated media may not leak into permeate and permeate may not leak into contaminated media.

A seal gasket may have any desired shape. In some embodiments, a seal gasket may have a generally cylindrical and/or generally barrel shape defining a central longitudinal axis and a cavity spanning its length. For example, up to all sections perpendicular to a central seal gasket axis may have a generally annular shape. A seal gasket may have a hollow, generally cylindrical shape, a first end and a second end according to some embodiments. Each end may define an aperture. In some embodiments, a seal gasket may have an inner surface defining an inner radius and an outer surface defining an outer radius. Cross-sections of a cavity may not vary in dimensions along the length of a seal gasket. For example, the radius of a seal gasket cavity (e.g., inner radius) may be substantially constant along the length of a seal gasket. The radius of a cavity at a first end may be smaller than the radius of the remainder of the length of the cavity. For example, a first end may define a lip configured to overhang at least a portion of an end of a filter. A lip may be sized and/or proportioned, in some embodiments, to abut an end of a filter and/or prevent a seal gasket from being installed and/or moving along the length of a filter past a preset position (e.g., at the end of a filter).

According to some embodiments, the radius of the outer surface of a seal gasket may vary as desired. To sealably engage an interface, for example, it may be desirable for an outer surface to be tapered (e.g., a smaller outer radius toward the end and a larger outer radius toward the middle). In some embodiments, a seal gasket may have a taper at one or both ends. A seal gasket may be configured to accommodate a band or reinforcing ring. According to some embodiments, a band may apply radial pressure on a seal gasket to secure it to a filter. A band may be positioned near or at the middle of a length of a seal gasket. A seal gasket may be (e.g., about halfway between the ends and perpendicular to the central axis). In some embodiments, a seal gasket may have a circumferential channel (e.g., on its outer surface) configured to receive a reinforcing ring and/or band. One or both edges of a circumferential channel may be configured to have a ridge. A ridge may be proportioned to reduce or prevent movement of a band along the length of a seal gasket. A ridge may define one end of a taper, according to some embodiments.

A seal gasket may be formed of any desirable material. In some embodiments, a seal gasket may comprise a hydrophobic material, a resilient material, an elastomeric material and/or combinations thereof. A seal gasket may comprise a material that is hydrophobic, resilient, elastomeric, and/or combinations thereof, according to some embodiments. For example, a seal gasket may comprise a natural rubber, a synthetic rubber, a neoprene, a perfluoroelastomer (e.g., Kalrez®, Viton®), ethylene acrylic elastomer, a polyolefin elastomer, an olefin block copolymer, an ethylene-propylene-diene monomer, a thermoplastic, a plastomer, a brominated isobutylene paramethyl-styrene terpolymer, a silicone, and/or combinations thereof.

In some embodiments, a seal gasket may comprise a taper and/or define a frustoconical shape at each end. The pitch of each taper may independently be selected from about 1° to about 30°, about 2° to about 25°, about 5° to about 20°, about 10° to about 30°, and/or combinations thereof. Each aperture of each filtration assembly interface may comprise a taper and/or define a frustoconical shape having a pitch independently selected from about 1° to about 30°, about 2° to about 25°, about 5° to about 20°, about 10° to about 30°, and/or combinations thereof. A taper angle may be the angle between the central longitudinal axis and a coplanar line parallel to the surface of the taper.

A seal gasket may have any desired dimensions. According to some embodiments, a seal gasket may be from about 1 cm to about 10 cm long, from about 1 cm to about 20 cm long, from about 1 cm to about 30 cm long, from about 5 cm to about 20 cm long, from about 10 cm to about 20 cm long, and/or combinations thereof. A seal gasket, in some embodiments, may have an inner and/or outer radius (e.g., an average, a minimum, a maximum) of from about 1 cm to about 10 cm, from about 1 cm to about 20 cm, from about 1 cm to about 30 cm, from about 5 cm to about 20 cm, from about 10 cm to about 20 cm, and/or combinations thereof. In some embodiments, a seal gasket's length may be greater than it's diameter. A seal gasket may have a wall that is from about 5 mm to about 5 cm thick, from about 5 mm to about 10 cm thick, from about 5 mm to about 20 cm thick, from about 1 cm to about 10 cm thick, from about 2 cm to about 15 cm thick, and/or combinations thereof.

A ceramic filter seal gasket may comprise, according to some embodiments, a wall defining a hollow cylinder having an interior circumferential surface, an outer circumferential surface, a first end, a first end aperture, a second end, and/or a second end aperture. In some embodiments, a wall at the first end may be thickened radially inwardly to form a lip, a wall may be thickened radially outward to form a first lengthwise taper extending from the first end with increasing radius (e.g., thickness) towards the second end, a wall may be thickened radially outward to form a second lengthwise taper extending from the second end with increasing radius (e.g., thickness) towards the first end, and/or a wall may be thickened radially outward to form a first central, circumferential ridge and a second central, circumferential ridge, with a circumferential channel separating the first and second ridge. A seal gasket may be primarily on a membrane (e.g., not on a substrate). A ceramic filter seal gasket may be a single, integral unit according to some embodiments. For example, a seal gasket may be free of seams around its circumference and/or free of seams along its length.

Methods of Use

The present disclosure relates, according to some embodiments, to methods for using a filtration system and/or apparatus. For example, a purification and/or filtration method may comprise contacting a contaminated fluid with a filter (e.g., a ceramic filtration membrane). According to some embodiments, contacting a contaminated fluid with a filter (e.g., a ceramic filtration membrane) may include forming a permeate (e.g., fluid that passes through filter pores) and a concentrate (e.g., fluid that does not pass through filter pores).

In some embodiments, a filtration system, apparatus, and/or method may be configured to operate, according to some embodiments, continuously, substantially continuously (e.g., continuously, but for brief maintenance work), semi-continuously (e.g., less than 24 hours per day), periodically (e.g., over regular and/or irregular intervals), on-demand, or combinations thereof. In some embodiments, a filtration system, apparatus, and/or method may be operated to provide microfiltration, ultrafiltration, and/or nanofiltration of a subject fluid.

According to some embodiments, filtration may be conducted (e.g., a filtration module may be operated) with fewer or no periodic testing (e.g., QA/QC testing). For example, existing water filtration systems may have to be tested daily to assess and/or ensure membrane integrity and leak-free filtration. Configuration of a filtration assembly according to some embodiments may alone provide at least the same level of assurance without the need to test as frequently.

A method may comprise operating a fluid filtration system with any desired throughput (e.g., contaminated media intake, permeate output, concentrate output, and/or combinations thereof), in some embodiments. For example, a method may be scalable to achieve a desired processing volume by varying the number of membrane elements and/or varying the number of modules used.

Methods of Making

According to some embodiments, methods of making a filter seal gasket may comprise extruding a resilient, elastomeric, and/or resilient material to form a tube. A method of making a filter seal gasket may comprise injecting a resilient, elastomeric, and/or resilient material into a mold to form a tube. Any desired surface feature may be included when a gasket is formed or machined onto a blank after formation.

The present disclosure relates, according to some embodiments, to methods of making a filtration apparatus and/or system. For example, a method may comprise pushing a seal gasket on one or both ends of a ceramic membrane filter within a permeate chamber (e.g., until a seal gasket lip contacts an end of the filter), securing a permeate chamber filtration assembly interface at each end of the permeate chamber, each filtration assembly interface comprising a circumferential flange (optionally having an O-ring channel on an outward face) and one or more tapered apertures configured to engage a second taper of a seal gasket, securing a contaminated media chamber having a filtration interface to each end of the permeate chamber (e.g., by a contaminated media chamber flange matched to the permeate chamber flanges), and/or combinations thereof.

A method may optionally comprise installing an O-ring in an O-ring channel partially defined by a contaminated media chamber flange and partially defined by a permeate chamber flange. In some embodiments, however, an O-ring may be unnecessary and/or wanted. For example, a system without a triple seal may require an O-ring seal to complete the contact between a contaminated media chamber and a permeate chamber. A disadvantage of such a system may be that contaminated media (e.g., contaminated media at a higher pressure than a permeate) may bypass a membrane filter into the permeate. The presence of a triple seal between a contaminated media chamber and a permeate chamber may obviate the need for an O-ring and/or substantially prevent membrane bypass. A system with a triple seal, according to some embodiments, may have no risk or only an ultra-low risk of fluid bypassing a membrane. For example, a triple seal system may comprise a gap at lower pressure (e.g., atmospheric pressure) between chamber housings such that, if any fluid were to leak, it would pass out of the system and into the gap. It may move under the influence of gravity and, in the absence of an O-ring, drip from a lower portion of a flange. Since a triple seal system may be operated at a pressure higher than atmospheric pressure, any fluid that emerges from the system into the gap (e.g., through a leak) would be substantially unable or completely incapable of re-entering the system.

A method may further comprise forming a triple seal on the membrane to the membrane gasket (e.g., as a contaminated media chamber interface and/or a permeate chamber interface is snugged on a filtration assembly). According to some embodiments, a method may further comprise contacting a filtration assembly with a contaminated media chamber interface and a permeate chamber interface to establish permanent compression on both tapered sections to ensure a positive seal on both ends. A method may comprise securing a seal gasket on a ceramic membrane filter with a reinforcing ring or band (e.g., positioned in a band channel between two circumferential ridges), in some embodiments.

A method may comprise providing at least one elongate filter in a permeate chamber having a filtration assembly interface at each end, each filtration assembly interface having at least one frustoconical aperture, pushing a seal gasket having a seal gasket lip, a proximal taper, and distal taper on each end of each filter until each seal gasket lip contacts the end of the filter onto which it is pushed and the distal taper on each seal gasket engages a frustoconical aperture, and/or securing a contaminated media chamber having a filtration interface with at least on frustoconical aperture to each end of the permeate chamber (e.g., by a contaminated media chamber flange matched to the permeate chamber flanges), and/or combinations thereof, wherein a triple seal is formed. In some embodiments, a method may further comprise fixing a contaminated media chamber to a permeate chamber. For example, each end of a permeate chamber may have a flange fixed to the permeate chamber and a contaminated media chamber may have a flange fixed to the permeate chamber and the flanges may be fixed to each other. A method may comprise securing a concentrate fluid chamber to one end of a permeate chamber.

Specific Example Embodiments

Specific example embodiments of a seal gasket are illustrated in FIGS. 1A-1B. Seal gasket 130 comprises seal gasket wall 131 defining inner surface 140, and outer surface 150. As shown, inner surface 140 comprises proximal aperture 141, cavity 142, and distal aperture 143. The diameter of cavity 142 is the same or substantially the same as distal aperture 143. Proximal aperture 141 is smaller than distal aperture 143. Proximal aperture 141, cavity 142, and distal aperture 143 define a central axis.

As shown, outer surface 150 comprises lip 151, taper 152, ridge 153, channel 154, ridge 155, and taper 156. Lip 151 constitutes a radial inward (e.g., relative to inner surface 140), thickening at the proximal end of seal gasket wall 131. Taper 152 constitutes a radial outward (e.g., relative to inner surface 140) thickening in seal gasket wall 131 extending from proximal aperture 141. Ridge 153 defines the distal end of taper 152. Ridge 153 and ridge 155 constitute thickenings in wall 131 that encircle seal 130. Ridge 153 and ridge 155 define the edges of channel 154. Taper 156 constitutes a radial outward (e.g., relative to inner surface 140) thickening in seal gasket wall 131 extending from distal aperture 143. Ridge 155 defines the proximal end of taper 156.

In sections of seal gasket 130 taken perpendicular to the central axis, inner surface 140 defines a generally hexagonal shape, but may be generally circular, generally hexagonal, and/or any other shape. In sections of seal gasket 130 taken perpendicular to the central axis, outer surface 150 defines a generally circular shape, but may be generally hexagonal, generally hexagonal, and/or any other shape. Cavity 142 and distal aperture 143 may be sized to fit snugly on a filter (e.g., a ceramic filter).

Specific example embodiments of a filter are illustrated in FIGS. 2A-2B. Filter 270 comprises channels 271, filtration layer 272, substrate 273, face 274, and sides 275. As shown, filter 270 has a generally hexagonal cross section with generally circular channels 271. Channels 271 extend through filter 270 along its length. Filtration layer 272 is positioned over substrate 273 and comprises outer filtration layer 272a, face filtration layer 272b, and inner filtration layer 272c. Outer filtration layer 272a extends from face 274 along a portion of sides 275. The inner surface of each channel 271 is completely covered by inner filtration layer 272c. Face filtration layer 272b covers face 274 and is contiguous with outer filtration layer 272a and inner filtration layer 272c. Filtration layer 271 may wrap around both faces and partially cover the sides on each end of a filter.

Specific example embodiments of a filtration assembly are illustrated in FIGS. 3A-3B. Filtration assembly 320 comprises seal gasket 330, band 360, and filter 370. As shown, seal gasket 330 engages an end of filter 370 and is at least partially secured in place by reinforcing ring 360. A portion of the radial force to hold seal gasket 330 in place may come from resilience of materials comprising seal gasket 330. Inner surface 340 contacts sides 375 and lip 351 contacts face 274, together forming a fluid barrier. Aperture 341 and face 374 are sized to contribute to forming a fluid barrier with lip 351 occluding as few channels 372 as possible.

Specific example embodiments of a permeate chamber are illustrated in FIG. 4. Permeate chamber 410 comprises flange 411, O-ring channel 412, aperture 413, aperture wall 414, permeate chamber body 615, permeate chamber cavity 616, and outlet 617. As shown, permeate chamber 410 is generally cylindrical with flanges 411 on each end and outlet 417 extending from body 415. Flanges 411 may be contiguous with or fixed to body 415. Each flange 411 is a generally circular disc with a diameter larger than the diameter of body 415 such that each flange 411 overhangs body 415. Each flange 411 has a plurality of holes along its circumference in the overhang, each hole sized to receive a fastener (e.g., bolt). Flange 411 comprises O-ring channel 412 on the face directed away from body 415. Flange 411 is perforated with apertures 413, each having frustoconical wall 414. Flanges 411 and body 415 together define a permeate chamber cavity.

Specific example embodiments of a permeate chamber with installed filter assemblies are illustrated in FIG. 5. As shown, a plurality of filtration assemblies 520 are inserted in the apertures of flange 511. Filtration assemblies 520 have been pressed in such that each distal taper contacts a corresponding aperture wall and distal ridges contact flange 511.

Specific example embodiments of a filtration module are illustrated in FIGS. 6A-6C. Filtration module 600 comprises contaminated media chamber 605, permeate chamber 610, filtration assembly 620, and concentrate chamber 680. As shown, contaminated media chamber 605 and permeate chamber 610 are separated by gap 602 and secured to each other with a plurality of bolts and nuts. Contaminated media chamber 605 and the proximal end of seal gasket 630 together forming first a fluid-tight seal. Permeate chamber 610 and the distal end of seal gasket 630 form a second fluid-tight seal. Contaminated media chamber 605 is secured to permeate chamber 610 with sufficient force to form a triple seal against filter bypass between permeate chamber cavity 616 and cavity 607, the triple seal consisting of seal gasket 630 appressed to contaminated media chamber 605 at aperture 609, seal gasket 630 appressed to permeate chamber 610 at aperture 613, and seal gasket 630 appressed to filter 670 at filtration layer 672. Concentrate chamber 680 is similarly secured to the distal end of permeate chamber 610.

In operation, the fluid-tight seals formed result in contaminated media moving through inlet 606 into cavity 607, and flowing into and through crossflow filter 670. If any fluid bypasses seal gasket 630 appressed to aperture 609 (e.g., as gasket ages), it is directed into the space defined by flange 608 and flange 611. Optionally, one or more moisture sensors 619 may be installed in this space to detect the presence of fluid (e.g., contaminated media). Since gap 602 is open to the atmosphere, escaped fluid, if any, lacks any motive force to penetrate the seal formed between seal gasket 630 and aperture 613. Under the influence of gravity, it will simply drain or drip downward. Fluid that does not penetrate filter 670 but passes through, forming concentrate, exits filter 670 and enters concentrate chamber 680, from which it may exit filtration module 600.

Specific example embodiments of a filtration system are illustrated in FIG. 7. System 790 comprises contaminated media 791, feed 792, filtration module 700, concentrate 794, valve 795, pump 796, valve 797, and concentrate 798. Contaminated fluid 791 (e.g., contaminated water) may be pumped through a crossflow filter within filtration module 700 to filter out contaminants in the fluid. In some embodiments, a crossflow filter may be a membrane filter, such as a ceramic membrane. Ceramic membranes may have advantages including, for example, durability and/or an ability to filter out very small contaminants. As shown, contaminated media 791 is combined with recycled concentrate 798 to form feed 792. The proportion of contaminated media 791 and concentrate 798 may be adjusted as desired. For example, feed 792 may comprise from about 0% to about 99% concentrate 798, from about 1% to about 50% concentrate 798, from about 5% to about 25% concentrate 798, and/or combinations thereof. In some embodiments, the proportion of contaminated media 791 and concentrate 798 combined to form feed 792 may vary according to the concentration of solids and/or contaminates (actual or estimated) in each. This regulation may allow filtration efficiency to be adjusted (e.g., optimized) and or avoid overwhelming the filter with solids and/or contaminants.

Feed 792 enters filtration module 700 and emerges as permeate 793 or concentrate 794. Permeate may be collected as finished product or subjected to further treatment as desired. The remaining fluid, now enriched in contaminates due to volume lost as permeate, forms concentrate 794. Concentrate 794 may be directed to pump 796 by valve 795. Concentrate 798 is recycled from pump 796 through valve 797 to be combined with naïve contaminated media 791. Valves 795 and 797 may be operated as shut-off valves or may be configured to redirect fluid to alternate flow paths (e.g., for disposal, collection, further treatment, or another purpose). Alternate flow paths may or may not rejoin system 790 at the same point or another point along the flow path.

Operation of filtration module 700 as a crossflow filter may provide filtration of feed 792 with substantially no membrane fouling and/or with no reject from system 700. In some embodiments, system 700 may comprise additional purification modules, for example, to destroy contaminants and/or otherwise avoid ever-increasing amounts of solids and/or contaminate in the system (e.g., where all contaminate is recycled).

As will be understood by those skilled in the art who have the benefit of the instant disclosure, other equivalent or alternative compositions, devices, methods, and systems for fluid filtration can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, apertures, filters, gaskets, valves, pumps, sensors, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial or municipal fluid filtration applications) or down (e.g., to be used for lower throughput household or research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for fluid filtration may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A fluid filtration seal gasket comprising an interior circumferential surface and an outer circumferential surface,
   wherein the interior circumferential surface defines an inner radius of a cavity extending along a longitudinal axis from a first end to a second end,
   wherein the first end of the interior circumferential surface comprises a lip, wherein the inner radius of the cavity is smallest at the lip and then expands to a substantially constant value that is maintained along a remainder of the cavity stretching to the second end, wherein the outer circumferential surface comprises (a) a first taper initiating at a first end of the outer circumferential surface and culminating in a first circumferential ridge, (b) a second taper initiating at a second end of the outer circumferential surface and culminating in a second circumferential ridge, and (c) a channel disposed between the first circumferential ridge and the second circumferential ridge, wherein a radius of the outer circumferential surface is less than or equal to a radius of the channel, wherein a distance between the interior circumferential surface and the outer circumferential surface defines a thickness, wherein the thickness is greatest at at least one of the first circumferential ridge and the second circumferential ridge, and wherein the filtration seal gasket is configured to fit a filter end of an elongate ceramic membrane filter and to form a fluid-tight seal therebetween.

2. A fluid filtration seal gasket according to claim 1, wherein the first circumferential ridge, second circumferential ridge, and the channel are parallel to each other and perpendicular to the longitudinal axis.

3. A fluid filtration seal gasket according to claim 1, wherein the interior circumferential surface defines a generally hexagonal cross-section, a generally circular cross-section, or a generally elliptical cross-section.

4. A fluid filtration seal gasket according to claim 1, wherein the fluid filtration seal gasket comprises a hydrophobic material, a resilient material, an elastomeric material, or combinations thereof.

5. A fluid filtration seal gasket according to claim 1, wherein the fluid filtration seal gasket comprises a natural rubber, a synthetic rubber, a neoprene, a perfluoroelastomer, an ethylene acrylic elastomer, a polyolefin elastomer, an olefin block copolymer, an ethylene-propylene-diene monomer, a thermoplastic, a plastomer, a brominated isobutylene paramethyl-styrene terpolymer, a silicone, or combinations thereof.

6. A fluid filtration seal gasket according to claim 1, wherein a longest dimension across an interior circumferential surface cross-section is constant along a length of the fluid filtration seal gasket except for the lip.

7. A fluid filtration seal gasket according to claim 1, wherein the fluid filtration seal gasket has a length of about 1 cm to about 30 cm, and wherein an outer radius of the fluid filtration seal gasket is from about 1 cm to about 30 cm.

8. A filtration seal gasket having a generally tubular shape or a generally cylindrical shape, the filtration seal gasket comprising:

an interior circumferential surface and an outer circumferential surface, wherein the interior circumferential surface defines an inner radius of a cavity extending along a longitudinal axis from a first end to a second end, wherein the first end of the interior circumferential surface comprises a lip, wherein the inner radius of the cavity is smallest at the lip and then expands to a substantially constant value that is maintained along a remainder of the cavity stretching to the second end, wherein the outer circumferential surface comprises (a) a first taper initiating at a first end of the outer circumferential surface and culminating in a first circumferential ridge; (b) a second taper initiating at a second end of the outer circumferential surface and culminating in a second circumferential ridge; (c) a ring channel disposed between the first circumferential ridge and the second circumferential ridge; and (d) a reinforcing ring, wherein a radius of the outer circumferential surface is less than or equal to a radius of the ring channel, wherein the ring channel is configured to receive the reinforcing ring, wherein a distance between the interior circumferential surface and the outer circumferential surface defines a thickness, wherein the thickness is greatest at at least one of the first circumferential ridge and the second circumferential ridge, and wherein the filtration seal gasket is configured to fit a filter end of an elongate ceramic membrane filter and to form a fluid-tight seal therebetween.

9. A filtration seal gasket according to claim 8, wherein successive cross-sections of the cavity have substantially the same shape and dimensions along a length of the filtration seal gasket except at the lip.

10. A filtration seal gasket according to claim 8, wherein successive cross-sections of the cavity have a shape that is substantially similar along a length of the filtration seal gasket.

11. A filtration seal gasket according to claim 8, wherein the cavity at the lip has a cross-section with a smaller maximum dimension than the cross-section of the cavity at any point along the remainder of the filtration seal gasket.

12. A filtration seal gasket according to claim 8, wherein the filtration seal gasket is seamless.

13. A filtration seal gasket according to claim 8, wherein a first pitch of the first taper is not the same as a second pitch of the second taper.

14. A cross-flow fluid filtration assembly comprising:

an elongate ceramic membrane filter having a first filter end, a second filter end, at least one filter side, and at least one interior channel spanning a length of the filter;

a first filtration seal gasket fixed to the first filter end forming a fluid-tight seal therebetween; and a second filtration seal gasket fixed to the second filter end forming a fluid-tight seal therebetween, each filtration seal gasket comprising an interior circumferential surface and an outer circumferential surface, wherein the interior circumferential surface defines an inner radius of a cavity extending along a longitudinal axis from a first end to a second end, wherein the first end of the interior circumferential surface comprises a lip, wherein the inner radius of the cavity is smallest at the lip and then expands to a substantially constant value that is maintained along a remainder of the cavity stretching to the second end, wherein the outer circumferential surface comprises (a) a first taper initiating at a first end of the outer circumferential surface and culminating in a first circumferential ridge; (b) a second taper initiating at a second end of the outer circumferential surface and culminating in a second circumferential ridge; (c) a ring channel disposed between the first circumferential ridge and the second circumferential ridge; and (d) a reinforcing ring, wherein a radius of the outer circumferential surface is less than or equal to a radius of the ring channel, wherein the ring channel is configured to receive the reinforcing ring, wherein a distance between the interior circumferential surface and the outer circumferential surface defines a thickness, and wherein the thickness is greatest at at least one of the first circumferential ridge and the second circumferential ridge.

15. A cross-flow fluid filtration assembly according to claim 14, wherein each lip overhangs a portion of each filter end.

16. A cross-flow fluid filtration assembly according to claim 14, wherein the cavity, the first filter end, and the second filter end are mutually sized to form the fluid-tight seal therebetween.

\* \* \* \* \*